United States Patent [19]
Nakatani et al.

[11] Patent Number: 5,180,512
[45] Date of Patent: Jan. 19, 1993

[54] METHOD OF MANUFACTURING FINE-PARTICLE COLLOID OR MAGNETIC FLUID

[75] Inventors: Isao Nakatani; Kiyosho Ozawa; Masayuki Hijikata; Tsutomu Takahashi, all of Tokyo, Japan

[73] Assignee: National Research Institute for Metals, Tokyo, Japan

[21] Appl. No.: 684,387

[22] Filed: Apr. 12, 1991

[30] Foreign Application Priority Data

Apr. 12, 1990 [JP] Japan .................................. 2-95178
Apr. 12, 1990 [JP] Japan .................................. 2-95179
Nov. 22, 1990 [JP] Japan .................................. 2-316226

[51] Int. Cl.$^5$ .................... B01J 13/00; C01B 21/06; H01F 1/00
[52] U.S. Cl. ................. 252/62.51; 252/309; 422/198; 423/409
[58] Field of Search ............. 423/409; 252/62.51, 252/309

[56] References Cited

U.S. PATENT DOCUMENTS 2,872,292  2/1959  Altmann ............................ 423/409

FOREIGN PATENT DOCUMENTS 288071  12/1986  Japan ................................. 423/409

OTHER PUBLICATIONS

Nakatani et al., "Iron-Nitride Magnetic Fluids Prepared by Plasma CVD Technique and Their Magnetic Properties", Journal of Magnetism and Magnetic Materials 85 (1990) 11-13.

Nakatani et al., "Preparation and Magnetic Properties of Colloidal Ferromagnetic Metals", Journal of Magnetism and Magnetic Materials 65 (1987) 261-264.

Primary Examiner—Wayne Langel
Attorney, Agent, or Firm—Wenderoth, Lind & Ponack

[57] ABSTRACT

A method of manufacturing a fine-particle colloid or a magnetic fluid of a metal nitride through reaction between a metal carbonyl and a nitride-bearing compound, a two-step reaction is performed, comprising a first-step reaction of synthesizing a nitrogen-bearing metal carbonyl which is a precursor substance and a second-step reaction of synthesizing metal nitride from said precursor substance. A step of eliminating unreacted metal carbonyl is provided between the two-step reaction. By repeatedly causing the series of reactions, a fine-particle colloid or a magnetic fluid of the metal nitride is manufactured. For the magnetic fluid, the solvent may be replaced in response to a particular purpose of use of application after production.

10 Claims, 3 Drawing Sheets

F I G. 1
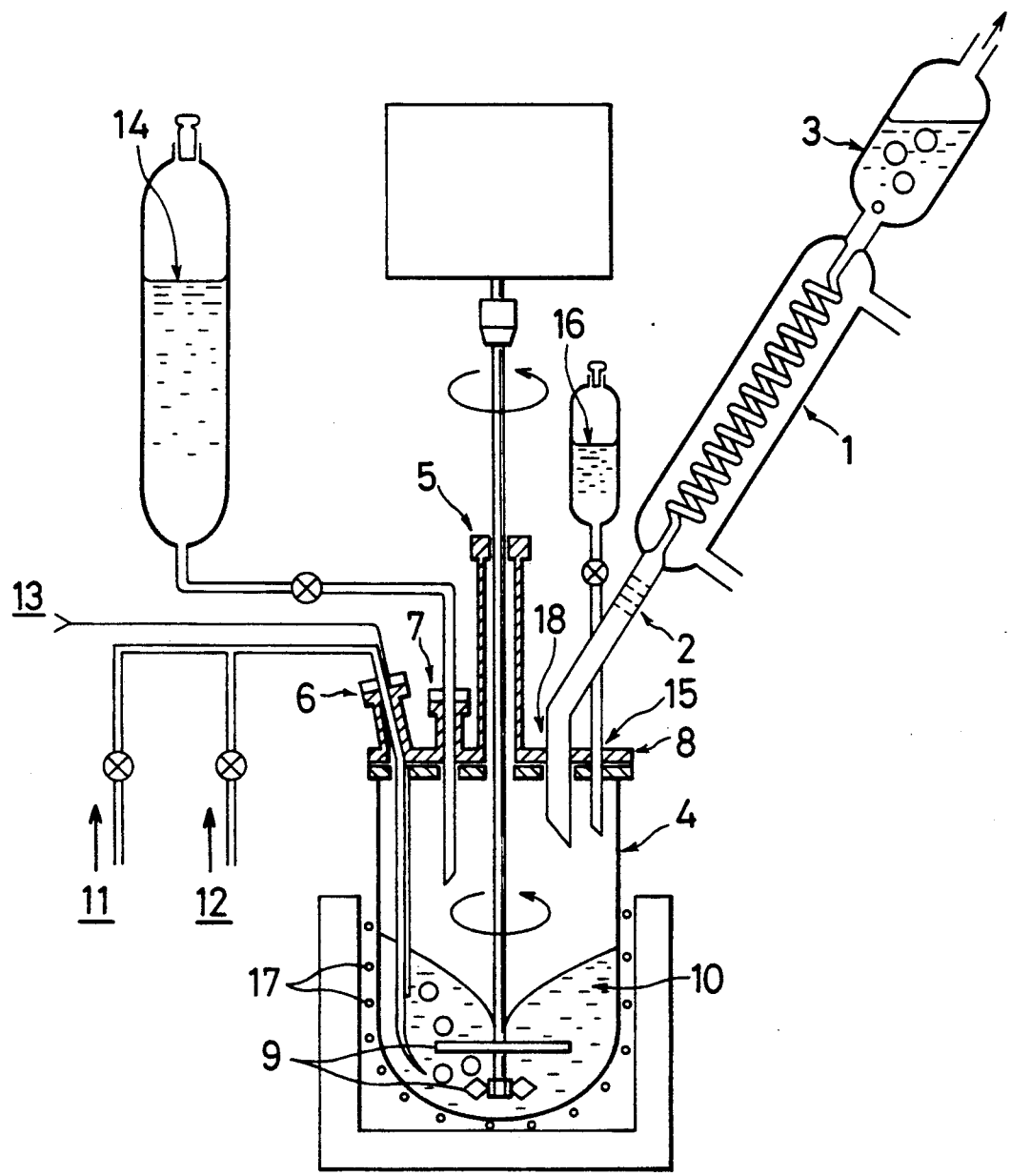

F I G. 2(a)
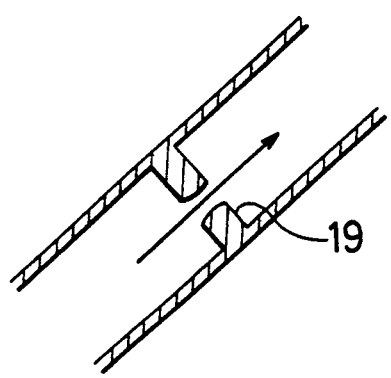
F I G. 2(b)
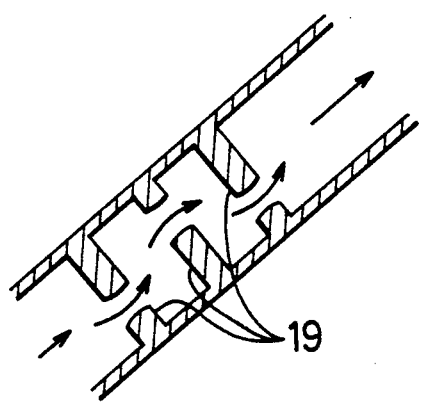

METHOD OF MANUFACTURING FINE-PARTICLE COLLOID OR MAGNETIC FLUID

FIELD OF THE INVENTION

The present invention relates to a method of manufacturing a fine-particle colloid or a magnetic fluid of a metal nitride. More particularly, the present invention relates to a novel manufacturing method which permits the manufacture of a fine-particle colloid or a magnetic fluid of a metal nitride having a uniform particle size and excellent dispersibility.

DESCRIPTION OF THE PRIOR ART

As a method of synthesizing fine particles or a magnetic fluid of iron nitride, the plasma CVD method has been conventionally known. This method comprises introducing iron carbonly, $Fe(CO)_5$, vapor into glow discharge plasma, for example, of ammonia gas, $NH_3$, producing fine particles of iron nitride through reaction between iron, Fe, atoms produced from dissociation of iron carbonyl, $Fe(CO)_5$, in plasma and ammonia, $NH_3$, molecules excited by plasma, and entrapping these fine particles into an oily medium containing a surfactant, thereby manufacturing a magnetic fluid. A plasma CVD device for rational and efficient progress of this reaction has already been developed.

However, although this method has a wide scope of application, the reaction proceeds in glow discharge plasma, which is an ionized low-pressure gas, and fine particles of iron nitride formed in the vapor phase continue to fusion-grow while repeating mutual collision during the period until the particles diffuse in the vapor phase and are deposited onto the inner wall of the reactor, and as a result, the size of the fine particles have a large statistical distribution, thereby making it difficult to obtain fine particles of a uniform size.

Another method for synthesizing fine particles or a magnetic fluid of a metal nitride is the vapor-liquid phase reaction method already established by the present inventors. This method comprises heating a non-aqueous solution of a metal carbonyl such as iron carbonyl, $Fe(CO)_5$, and a surfactant while pouring ammonia gas, $NH_3$, into the solution, thereby causing production of fine particles of the metal nitride such as iron nitride in the non-aqueous solution. According to this method, nuclear formation and growth of fine particles proceed in the solution, so that the size of fine particles is far more uniform than in the above-mentioned plasma CVD method.

However, even in the latter method, when using as the starting material a solution in which a metal carbonyl has been dissolved to a high concentration in an attempt to obtain a high-concentration colloid of fine particles of metal nitride or a fluid with highly saturated magnetization of a metal nitride, fine particles have an extremely large particle size and are non-uniform, and this causes serious impairment of the dispersion stability of the high-concentration colloid. In fact, this method was not suitable for the manufacture of a high-concentration fine-particle colliod. Therefore, when attempting to obtain a high-concentration fine-particle colloid or a fluid with high-saturation magnetization by this method, it is necessary to use a two-step process comprising once synthesizing a low-concentration colloid, and then concentrating the resultant colloid through evaporation of the solvent.

SUMMARY OF THE INVENTION

The present invention relates to method of manufacturing a fine-particle colloid or a magnetic fluid of a metal nitride which comprises introducing a nitrogen-bearing compound in a solvent containing a metal carbonyl and a surfactant, and heating the mixture to cause a reaction. According to this method, one can produce a fine-particle colloid or a magnetic fluid of a metal nitride having a reduced fine particle size and uniform distribution thereof, even when manufacturing a fine-particle colloid or a magnetic fluid with a high concentration of metal nitride.

Another object of the present invention is to provide a vapor-liquid phase reactor which permits efficient and simple manufacture of a fine-particle colloid or a magnetic fluid of a metal nitride without the need for a complicated process.

A further object of the present invention is to provide a method of manufacturing a magnetic fluid of a metal nitride, which permits configuration of a dispersion system in response to a particular purpose of use and application of the magnetic fluid.

These and other objects, features and benefits of the present invention will be more clearly understood by reading the following detailed description and drawings.

BRIEF DESCRIPTION OF THE DRAWINGS

FIG. 1 is a sectional view illustrating an embodiment of the apparatus applicable for the present invention;

FIG. 2 (a) and (b) are sectional views respectively illustrating a flow resistant element.

DETAILED DESCRIPTION OF THE INVENTION

Figure 3:
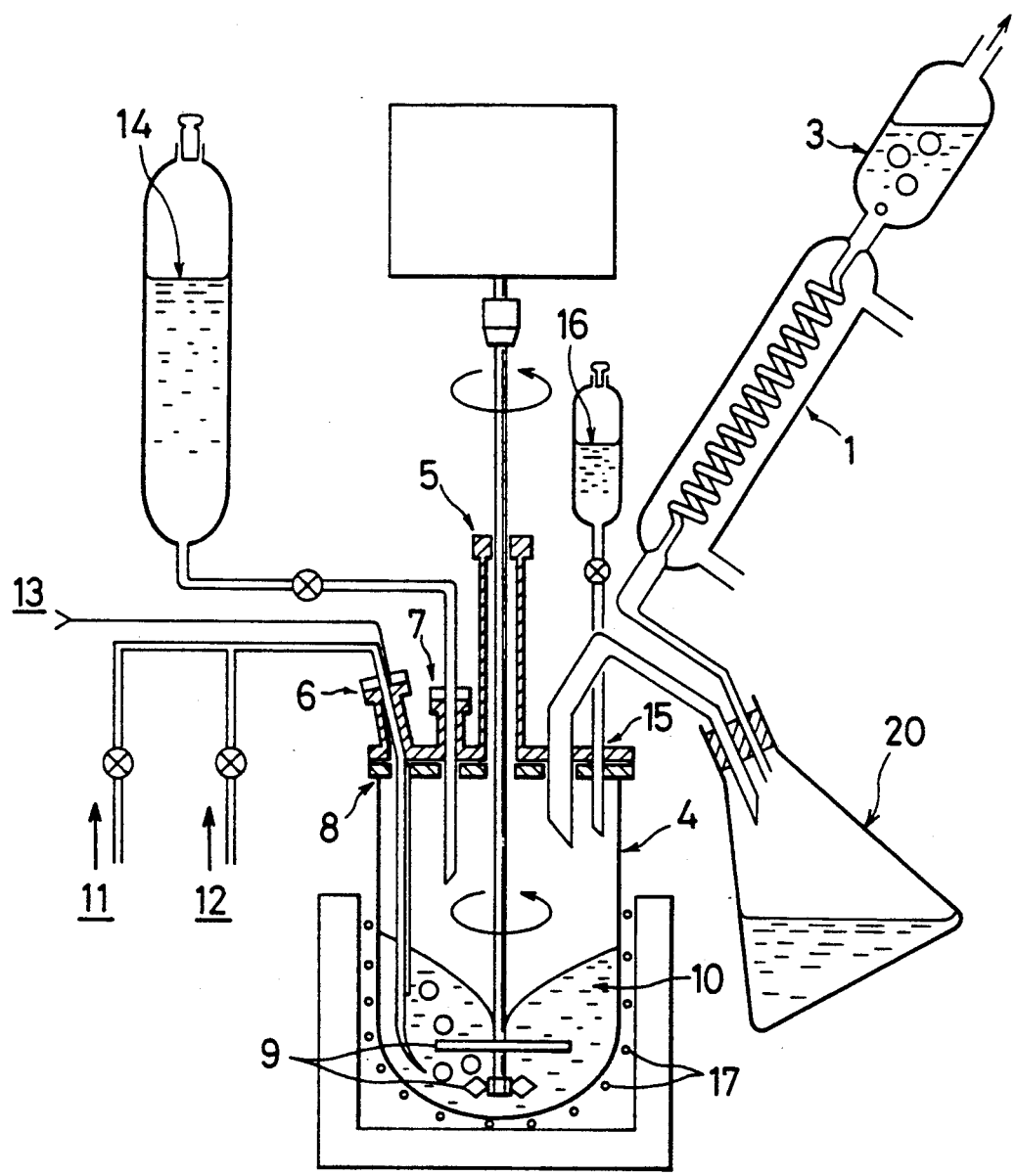
FIG. 3 is a sectional view illustrating another embodiment of the apparatus applicable for the present invention.

The present invention has a construction based on the clarification of the following reaction mechanism.

In the vapor-liquid phase reaction, iron carbonyl reacts with ammonia, as shown in the following reaction formulae I and II, to form, as a precursor, and iron carbonyl amino complex, $Fe(CO)_l(NH_m)_n$, which is sequentially dissociated to produce fine particles of iron nitride:

$$Fe(CO)_5 + NH_3 \rightarrow Fe_3(CO)_9(NH)_2 \rightarrow Fe_2(CO)_6(NH_2)_2 + CO + H_2 \quad (I)$$

$$Fe_2(CO)_6(NH_2)_2 \rightarrow Fe_3N + CO + NH_3 + H_2 \quad (II)$$

The reaction I which forms the precursor prevails at a reactor temperature of higher than 70° C., whereas the reaction II in which iron nitride is formed from the precursor occurs at a temperature of higher than 120° C.

In parallel with these reactions, those of direct dissociation without the reaction of $Fe(CO)_5$ with $NH_3$ tend to take place simultaneously, as shown in the following formulae III to V:

$$2Fe(CO)_5 \rightarrow Fe_2(CO)_9 + CO \quad III$$

$$3Fe_2(CO)_9 \rightarrow 2Fe_3(CO)_{12} + 3CO \quad IV$$

$$Fe_3(CO)_{12} \rightarrow 3Fe + 12CO \quad \text{V.}$$

These reactions III to V occurring at a temperature higher than 100° C. are well known, producing generally non-crystalline iron particles, a-Fe.

If $Fe(CO)_5$ is present upon heating to a temperature of at least 120° C., a-Fe, therefore, is always by-produced in addition to $Fe_3N$ which is the target of reaction, thus resulting in a decreased reaction yield of iron nitride. Since a-Fe present in mixture not only impairs chemical stability of the magnetic fluid as a whole, but also is precipitated onto the surfaces of $Fe_3N$ fine particles, $Fe_3N$ fine particles coagulate together with each other so that fine particles become coarser ones, thus causing the magnetic fluid to lose dispersion stability thereof.

The present inventors, therefore, carried out extensive studies, and found that the above-mentioned problem could be solved by working out the manufacturing method so as to inhibit the sub-reaction III and cause only the main reaction I to occur, thus completing the present invention.

More specifically, in the present invention, when using iron carbonyl, $Fe(CO)_5$, for example, as the metal carbonyl, a two-step reaction process is carried out, which comprises synthesizing a precursor substance at a temperature lower than 100° C., and then synthesizing iron nitride from the precursor substance st a higher temperature higher than 120° C. Between these two reaction steps, an appropriate step for the elimination of unreacting $Fe(CO)_5$, for example, may be inserted. This step may comprise, for example, distilling the reaction products under a reduced pressure after the completion of the synthesizing reaction of the precursor substance, or using a rational apparatus preventing the reaction products from participating in the subsequent reaction by bringing apart from the reactor in space. When a high-concentration colloid is to be made available, the above-mentioned process may be repeated multiple times.

In an apparatus applicable for the present invention, as shown in FIG. 1, for example, a lid (8) having several air-tight inlet flanges (5), (6) and (7) is hermetically connected to a round-bottomed reactor (4) made of a refractory, or more preferably, of a metal. A rotary shaft is inserted into the inlet flange (5), and a stirrer (9) is attached to the tip of the rotary shaft to permit stirring solution (10). A nitrogen-bearing compound such as $NH_3$ gas, for example, is introduced through an inlet pipe (11), and an inert gas such as Ar gas, for example, is introduced through another inlet pipe (12). In addition, a thermocouple or a resistance thermometer (13), for example, for measuring and controlling the reaction temperature is inserted into the reactor (4) through the flange (6). A metal carbonyl liquid (14) such as $Fe(CO)_5$, for example, is introduced through the inlet flange (7), and a surfactant (16) is added to the reaction system through an inlet port (15). The structure should permit heating the bottom of the reactor (4) by a resistance heater (17).

In this embodiment, a flow resistant element (2) which is low in flow resistance relative to vapor and high in flow resistance relative to liquid is provided at the bottom of a cooler (1), and via this flow resistant element (2), the cooler (1) is connected to a gas discharge port (18) of the lid (8) of the reactor (4). A reservoir (3) is provided at the top of the cooler (1) to discharge waste gas through this reservoir (3) to outside the reaction system.

The flow resistant element (2) having appropriate construction and properties presents the following functions and effects.

During the synthesizing reaction of the precursor substance at a low temperature in the first step, for example, lower than 100° C., i.e., when iron carbonyl, $Fe(CO)_5$, has a low vapor pressure, vapor in only a small amount flows up from the bottom through the flow resistant element (2). The liquid of iron carbonyl having been condensed in the cooler (1), therefore, flows down through the flow resistant element (2) into the reactor (4). During the subsequent reaction in the second step for synthesizing iron nitride from the precursor substance, on the other hand, at a higher temperature, for example, at 120° C., the raw material iron carbonyl has a high vapor pressure, so that vapor in a larger amount flows up through the flow resistant element (2). Consequently, the liquid of iron carbonyl having been condensed in the cooler (1) does not flow down, but is pushed up to stay in the reservoir (3), so that the concentration of iron carbonyl in the reactor is kept very low during the progress of the second-step reaction.

When causing the synthesizing reaction of the precursor again at a temperature lower than 100° C. to increase the colloid concentration, iron carbonyl stored in the reservoir (3) flows down again into the reactor (4). Thus, iron carbonyl participates in the reaction while moving reciprocally between the reactor and the liquid reservoir until the entire mass participates in the reaction.

As the flow resistant element (2) having such functions and effects, a structure having an orifice (19) inserted in the middle of the pipe as shown in FIG. 2(a) may be used, or one with multiple orifices as shown in FIG. 2(b) may also be employed. This may also be a hose having an appropriately small inside diameter and an appropriate length. The shape, design and size may be decided appropriately taking account of the flow rate of the flowing vapor, the vapor pressure of metal carbonyl, and viscosity thereof.

By using an apparatus as described above, operation of eliminating unreacting metal carbonyl becomes simpler and easier than in distillation under a reduced pressure, thus enabling to improve operational efficiency. The cooling step for cooling the reaction system, which is required for the distillation under a reduced pressure, is not necessary, thus permitting improvement of the energy efficiency. In addition, this apparatus allows to utilize all unreacting raw materials, and thus to improve the utilization efficiency of raw material.

With the method of manufacturing a magnetic fluid of iron nitride as an example, the reaction process is described below.

Ammonia gas $NH_3$, or a mixed gas of ammonia gas, $NH_3$, and an inert gas such as Ar is introduced into kerosene solution (10) containing dissolved iron carbonyl, $Fe(CO)_5$, and a surfactant, and the mixture is heated to 100° C. while stirring with a stirrer (9). In this process, vapor of iron carbonyl and kerosene condenses at the cooler (1) and flows back to the reactor (4). CO and $H_2$ generated and $NH_3$ in excess pass through the cooler (1) and are discharged to outside the system. A precursor of an appropriate concentration is produced in the reactor (4). Then, by heating the reactor during inflow of $NH_3$ to a temperature of at least 120° C., excess Fe(CO)$_5$ having a high vapor pressure, which has not participated in the formation of the precursor, is condensed at the cooler (1) and stays in the reservoir (3), whereas the precursor of a low vapor pressure remains within the reactor (4) and is dissociated to form fine iron nitride particles. By repeating this process several times, the raw material Fe(CO)$_5$ is finally consumed while flowing forward and backward between the reactor (4) and the reservoir (3), reaction being completed.

The magnetic fluid of iron nitride with kerosene as a solvent is thus obtained.

According to this method, it is possible to achieve a uniform particle size of fine iron nitride particles in the dispersed phase and to adjust the particle size to any value within a range of from 6 to 12 nm at an accuracy of 1 nm, with a saturation magnetic flux density of from 400 to 1,000 gauss. Following the above-mentioned reaction, by concentrating the magnetic fluid resulting from the reaction through distillation of part of kerosene in the reactor, a magnetic fluid of iron nitride having a very high performance is available as typically represented by a saturated magnetic flux density of 2,400 Gauss on the maximum.

Kerosene presented as an example in the process as described above, being a solvent of the reaction solution at the start of reaction, becomes a solvent for the magnetic fluid with no change at the end of the reaction. While kerosene does not positively participate in the reaction, it is considered the most suitable for the above-mentioned reaction temperature and distillation temperature because the boiling-point of kerosene distributes at the range of 150° to 250° C.

The present invention allows, on the other hand, one to appropriately change the solvent for the magnetic fluid, depending upon the purpose of use and application.

The vacuum seal of the rotary shaft using the magnetic fluid is widely applied, for example, for a manufacturing apparatus of semiconducting materials, an X-ray generator, and other apparatuses under vacuum. Because the magnetic fluid is directly exposed to vacuum in these apparatuses, the solvent for the magnetic fluid must have a low vapor pressure and be hard to evaporate. Without a sufficiently low vapor pressure, solvent vapor would contaminate the vacuum apparatus, and the solvent for the magnetic fluid would be lost through evaporation. As a result, the magnetic fluid itself would lose fluidity thereof, transforming from sol to gel, and the vacuum seal would be broken. Alkylnaphthalene is widely used in general as a solvent for the magnetic fluid applied in such a vacuum seal.

The dust preventing seal of a rotary shaft using a magnetic fluid is employed in a rotary bearing for a computer hard disk, the mirror of a laser printer, a VCR magnetic head, or various rotating devices in a clean room. As the magnetic fluid works in these apparatuses under atmospheric pressure, it is not necessary for the vapor pressure thereof to be so low as the magnetic fluid for a rotary seal. However, the solvent for the magnetic fluid should have a particularly low viscosity coefficient so as to permit high-speed rotation with a small torque. In a magnetic fluid for such a dust preventing seal, the spindle oil of an olefin is widely applied as the solvent.

When the magnetic fluid is used for an inclination sensor or an acceleration meter, the fluidity and thermal stability must be satisfactory at respective temperatures at which these apparatuses work. When a magnetic fluid is used, on the other hand, as a mechanical part of an actuator or a damper, it should have a sufficient lubricity and should preferably be hardly flammable.

To cope with these diverse uses, the properties of the magnetic fluid should preferably be adjusted for each use.

In the present invention, therefore, after synthesizing a magnetic fluid of a metal nitride with a low-boiling-point liquid such as kerosene as the reaction solvent in the reactor (4), another solvent for replacement is added in the same reactor (4). This solvent should have a boiling point higher than that of the reaction solvent used for synthesis. A receptacle (20) is provided between the reactor (4) and the cooler (1), and ammonia gas or a mixed gas thereof with an inert gas is introduced under the same conditions as in the synthesis of the above-mentioned magnetic fluid carried out while heating the reactor (4) and stirring the contents therein, and is discharged through the cooler (1) to outside the system.

Through this process, the vapor of the reaction solvent having a low boiling-point is carried by the introduced gas, condensed at the cooler (1), and then stored in the receptacle (20). The added solvent having a high boiling-point stays, on the other hand, in the reactor (4), and thus the replacement is completed.

The solvent to be added for replacement may be an oil such as a fatty acid ester, a lubricant oil such as paraffin hydrocarbon oil, a naphthene hydrocarbon oil, an olefin hydrocarbon oil, or a monocyclic or polycyclic aromatic hydrocarbon oil, or a synthetic lubricant oil, such as dimethylsilicone, a pentaerythritol ester, a trimethylopropane ester, a polyolefin, a polybutene, a polyethylene glycol, polypropylene glycol, a tetradecilsilicate, tetraoctylsilicate, 2-ethylhexanol diester, an adipic ester, a sebacic acid ester, a polyphenyl ester, or a propylphenyl phosphate. These solvents should preferably have a vapor pressure lower by about a digit than that of the initial reaction solvent used for the synthesis of the magnetic fluid. By appropriately selecting a combination of two kinds of solvents, it is possible to accomplish a replacement for almost all the kinds solvents. Also, by appropriately adjusting the amount of addition, the concentration can be effected simultaneously with the replacement.

The above-mentioned method is a forced fractional distillation method based on the introduction of a carrier gas. The present invention is not, however, limited to this method. Introduction of the carrier gas is not necessarily required, and the extraction method, for example, is also effective for replacement.

According to the method of the present invention, the following effects are achievable:

1) a fine-particle colloid or a magnetic fluid having a satisfactory dispersibility and hard to aggregate is available;

2) a fine-particle colloid or a magnetic fluid having a low viscosity and high in fluidity is available;

3) a fine-particle colloid or a magnetic fluid having a high concentration is available;

4) a magnetic fluid having a high magnetization is available;

5) fine magnetic particles hard to be oxidized are available; and a magnetic fluid chemically stable even in a humid atmosphere is available;

6) an expensive device or facility is not required for the manufacture;

7) sophisticated knowledge or expertise is not required for the manufacture;

8) a lower-cost raw material is applicable;

9) fewer manufacturing steps are required with an improved operating efficiency;

10) the manufacturing process is simpler with a largely improved manufacturing efficiency;

11) the production quantity per unit time is larger;

12) no toxic substance is produced;

13) the vapor pressure of the magnetic fluid can be adjusted to any of various values;

14) the viscosity coefficient of the magnetic fluid can be adjusted to any of various values;

15) the other properties in respect to any of the magnetic fluids, including, for example, low-temperature fluidity, thermal stability, oxidation stability, hydrolysis stability, hard flammability, lubricity, and adaptability to living organisms, are freely adjustable.

Now, the present invention will be further described in detail by means of examples.

EXAMPLE 1

N-tetraethylenetetraaminopolybutenyl imido succinate in an amount of 23.6 g (molecular weight: approximately 1,300) was dissolved in kerosene in an amount of 50 g as a surfactant. Then, a reaction solution containing iron carbonyl, $Fe(CO)_5$, in an amount of 170.5 g was introduced into a reactor made of refractory glass attached with a stirrer, and the mixture was first heated to 80° C. for one hour while introducing ammonia gas, $NH_3$, at a rate of 390 cc per minute into the reaction solution to synthesize an iron amino carbonyl compound, which is a precursor substance. Subsequently, unreacting $Fe(CO)_5$ was distilled under a reduced pressure, and collected in another container, and the remaining reaction solution was heated to a temperature of 130° C. for one hour. Further, $Fe(CO)_5$ which has previously been collected is added again to the reaction solution, and this process was repeated four times in total, to complete all the reactions through a total consumption of 170.5 g of $Fe(CO)_5$.

The obtained iron nitride colloid comprised fine particles having a satisfactory crystallinity of $Fe_3N$ and $Fe_4N$ phases, giving a yield of almost 100% as nitride. The fine particles had a uniform size, with an average particle size of 6.5 nm, approximately 90% of the fine particles being within a range of ±1 nm.

EXAMPLE 2

N-tetraethylenetetraaminopolybutenyl imido succinate in an amount of 11.3 g (molecular weight: approximately 1,300) was dissolved in kerosene in an amount of 50.1 g as a surfactant. Then, a reaction solution containing iron carbonyl, $Fe(CO)_5$, in an amount of 150 g was introduced into a reactor made of refractory glass attached with a stirrer, and the mixture was first heated to 80° C. for one hour while introducing ammonia gas, $NH_3$, at a rate of 800 cc per minute into the reaction solution to synthesize an iron amino carbonyl compound, which is a precursor substance.

Subsequently, the temperature of the reaction solution was increased to 185° C. and further heated for one hour under the same conditions as above. By repeating this process five times, the raw material, $Fe(CO)_5$, was totally consumed to form fine iron nitride particles. The obtained iron nitride magnetic fluid was a kerosene-based magnetic fluid comprising kerosene in which fine iron nitride particles were dispersed, having a saturated magnetic flux density of 705 Gauss and a viscosity coefficient of 12.5 mPa.s. Alkylnaphthalene was added in an amount of 35 g to this kerosene-based metal nitride magnetic fluid, and a receptacle was provided at the reaction gas exit of the reactor, as shown in FIG. 3. Under the same conditions as in the reaction, kerosene vapor was forcedly transported through the receptacle to the cooler while introducing ammonia gas at a flow rate of 800 cc per minute into the reactor, and kerosene was collected in the receptacle through fractional distillation. Alkylnaphthalene-based iron nitride magnetic fluid was thus obtained in an amount of 65 cc, which had a saturated magnetic flux density of 900 Gauss, a viscosity coefficient of 200 mPa.s., and excellent dispersibility.

It is needless to say that the present invention is not limited to the above-mentioned cases of iron carbonyl, $Fe(CO)_5$, and iron nitride, but is applicable to carbonyls and nitrides of nickel, cobalt, tungsten, molybdenum and any other metals, and the operating conditions such as temperature may be changed in accordance with the kind of metal selected.

We claim:

1. A method of manufacturing a fine particle colloid of a metal nitride in non-aqueous solution, useful as a magnetic fluid, which comprises heating a non-aqueous solution containing a metal carbonyl and a surfactant dissolved therein while introducing a nitrogen containing compound into said non-aqueous solution, said heating being carried out at sufficient temperatures to effect a two step reaction in which metal carbonyl compound containing nitrogen is produced in the first step as a precursor and a second step in which a metal nitride is synthesized from said precursor.

2. A method according to claim 1 in which the reactions in steps one and two are carried out and gradually repeated to produce the metal nitride colloid.

3. A method according to claim 1 in which the unreacted metal carbonyl is removed between the reaction in step one and step two.

4. A method of manufacturing a fine particle colloid of iron nitride in a non-aqueous solution, useful as a magnetic fluid, which comprises heating a non-aqueous solution containing iron carbonyl and a surfactant dissolved therein, introducing ammonia gas and effecting a two stage reaction in which (I) the reactant solution is heated at a temperature lower than 100° C. to produce a metal carbonyl amino complex in a first stage reaction and (II) the metal carbonyl amino complex is dissociated at temperatures higher than 120° C. to produce fine colloidal particles of iron nitride in a second stage reaction.

5. A method according to claim 4 in which the reactions in steps one and two are as follows:

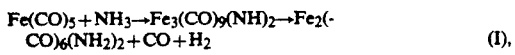  (I), and

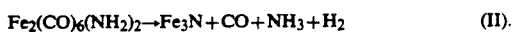  (II).

6. A method according to claim 4 in which the unreacted iron carbonyl is removed between the reaction in step one and step two.

7. A method of manufacturing as claimed in claim 3 or 6, wherein in said step of eliminating unreacting metal carbonyl, a manufacturing apparatus of a fine-particle colloid or a magnetic fluid, in which a reflux condenser provided with a waste gas discharge port is connected through a flow resistant element to the reactor is employed.

8. A method of manufacturing a magnetic fluid, which comprises the steps of heating a non-aqueous solution in the same manner as claimed in claim 1 or 4 and adding a solvent, different from the reaction solvent of said non-aqueous solution, to said metal nitride magnetic fluid for the replacement of solvent.

9. A method for manufacturing as claimed in claim 8, wherein a solvent is used for replacement which has a boiling point higher than that of the reaction solvent.

10. A method of manufacturing as claimed in claim 9, wherein a reaction solvent having a vapor pressure lower by one digit than that of the solvent for replacement is used.

* * * * *